United States Patent [19]

Yamaguchi et al.

[11] 4,230,525

[45] Oct. 28, 1980

[54] PROCESS FOR IMPROVING QUALITIES OF PAPER

[75] Inventors: Hideo Yamaguchi, Naruto; Masahiro Kobayashi, Tokushima; Atsunobu Mizote, Nara; Yoshiyuki Iwamuro, Kyoto, all of Japan

[73] Assignees: Otsuka Chemical Co., Ltd.; Sansho Co., Ltd., both of Osaka, Japan

[21] Appl. No.: 50,630

[22] Filed: Jun. 21, 1979

[30] Foreign Application Priority Data

Jun. 26, 1978 [JP] Japan ................................. 53-77830

[51] Int. Cl.² .............................................. D21H 3/38
[52] U.S. Cl. .......................... 162/164 R; 162/168 N; 162/168 NA; 162/183
[58] Field of Search ............... 525/327, 376, 370; 260/6 CM; 162/164 R, 168 N, 168 NA, 183

[56] References Cited

U.S. PATENT DOCUMENTS 4,171,413  10/1979  Hartman et al. ...................... 525/376

FOREIGN PATENT DOCUMENTS 43-4524 of 1968 Japan ............................... 162/168 NA
833459  4/1960 United Kingdom ...................... 525/376
839377  6/1960 United Kingdom ...................... 525/376

OTHER PUBLICATIONS

Machida "An Application of Polyacrylic Hydrazide," Sci. Reports of Fac. of Tex. Fibers, Kyoto Univ. of Ind. Arts & Text. Fib., vol. 1, pp. 38–43 (1970).

*Primary Examiner*—Richard V. Fisher
*Assistant Examiner*—Peter Chin
*Attorney, Agent, or Firm*—Armstrong, Nikaido, Marmelstein & Kubovcik

[57] ABSTRACT

A process for improving the qualities of paper which comprises making co-exist (a) a water-soluble polymer containing hydrazide group or its adduct with a water-soluble inorganic salt of an alkaline earth metal and (b) a heavy metal ion capable of chelating with the polymer or its adduct in a pulp slurry in paper making. The use of the water-soluble polymer or its adduct in combination with the heavy metal ion improves markedly the paper strength, the retention of sizing agents and the retention of fillers at a pH value around neutrality.

8 Claims, No Drawings

PROCESS FOR IMPROVING QUALITIES OF PAPER

BACKGROUND OF THE INVENTION

The present invention relates to a novel process for improving the qualities of paper. More particularly, it relates to a process for improving the qualities of paper in which the paper strength, the retention of sizing agents and the retention of fillers are markedly improved by employing a water-soluble polymer containing hydrazide group or its adduct with a water-soluble inorganic salt of an alkaline earth metal in combination with a specific heavy metal ion in a pulp slurry.

It is known that a water-soluble polymer containing acrylic or methacrylic hydrazide units in its polymer chain behaves as a cationic polymer in an acidic aqueous solution due to the presence of hydrazide group and is effective as a retention aid for sizing agents or a strengthening agent for paper. For instance, it is reported that the strengthening effect of the polymer is several times as good as that of α-starch and the sizing degree obtained by employing the polymer is several tens times as good as that obtained by employing a melamine-formaldehyde condensation product (see "J. Japanese TAPPI", Vol. 19, pages 440 to 445 (1965), Japan).

Such as acrylic or methacrylic hydrazide polymer (hereinafter referred to as "(meth)acrylic hydrazide polymer") is not absolutely protonated at a pH value of not less than 3.5. Therefore, when the polymer is employed in paper making, it should be protonated by adjusting the pH value of a pulp slurry to less than 3.5 with an acid such as hydrochloric acid. However, such a protonation employing hydrochloric acid causes a fatal problem that paper machines or dryers are corroded and further problems such as the indispensability of the neutralization of waste water because of its low pH value. For this reason, the (meth)acrylic hydrazide polymers have not been effectively utilized, despite that their usefulness is known.

OBJECTS OF THE INVENTION

It is an object of the present invention to provide a process for improving the qualities of paper in which a (meth)acrylic hydrazide polymer or its analog is employed effectively and practically as an agent for improving the qualities of paper.

Another object of the invention is to provide a process for improving the qualities of paper in which a (meth)acrylic hydrazide polymer or its analog is employed at a pH value around neutrality to give a paper markedly improved in its strength, retention of sizing agents and retention of fillers.

These and other objects of the invention will become apparent from the description hereinafter.

DETAILED DESCRIPTION

It has now been found that the above-mentioned objects can be accomplished by making co-exist (a) a water soluble polymer containing hydrazide group of the following general formula:

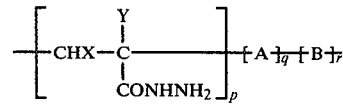

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:

$$30\% \text{ by mole} \leq p \leq 100\% \text{ by mole}$$

$$0\% \text{ by mole} \leq q + r \leq 70\% \text{ by mole}$$

$$p + q + r = 100\% \text{ by mole}$$

or its adduct with a water-soluble inorganic salt of an alkaline earth metal, and (b) a heavy metal ion capable of chelating with the polymer or its adduct in a pulp slurry in paper making.

Hereinafter, the water-soluble polymer containing hydrazide group of the above general formula is referred to as "hydrazide polymer".

When the hydrazide polymer or its adduct is employed in combination with a heavy metal ion capable of chelating with the polymer or its adduct at a pH value around neutrality in a pulp slurry, the resulting paper is markedly improved in its strength, retention of sizing agents and retention of fillers. As a result, the abovementioned problems encountered with the protonation of a (meth)acrylic hydrazide polymer employing hydrochloric acid can be completely settled.

Examples of the acrylate giving the monomer unit (A) of the hydrazide polymer employed in the present invention are acrylic acid alkyl esters such as methyl, ethyl, butyl or 2-ethylhexyl acrylate. Examples of the methacrylate giving the monomer unit (A) are methacrylic acid alkyl esters such as methyl, ethyl or butyl methacrylate. Examples of the monomer giving the monomer unit (B) are vinyl chloride, vinylidene chloride, vinyl acetate, butadiene, styrene, acrylic acid and acrylonitrile.

The hydrazide polymer employed in the present invention may be any of those shown in the above general formula where each unit is linked alternately or in block or in random. In general, the hydrazide polymer is prepared by thermally reacting homo- or co-polymers of acrylamide, methacrylamide, acrylates, methacrylates or maleic anhydride, or copolymers of these monomers with other monomers copolymerizable therewith, with 1 to 30 moles of hydrazine hydrate per mole of the acrylamide, methacrylamide, acrylate, methacrylate or maleic anhydride unit in the polymer chain. In some cases, the monomer units (B) may react with hydrazine hydrate. For instance, in case that vinyl acetate is copolymerized as a monomer copolymerizable with acrylamide, methacrylamide, acrylate, methacrylate or maleic anhydride, the acetoxyl group of the vinyl acetate units is hydrolyzed by hydrazine hydrate to hydroxyl group. Such a polymer is also included in the hydrazide polymer as defined above. Also, hydrazide group may intramolecularly or intermolecularly react with other hydrazide group, an ester group or an amide group to cause cross-linking partially. Such a polymer is also employed in the present invention unless it is insoluble in water.

In the hydrazide polymer employed in the present invention, it is necessary that the content of hydrazide group is not less than 30% by mole. When the content of hydrazide group is less than 30% by mole, the hydrazide polymer is poor in ability of forming chelate so that the qualities of paper are not sufficiently improved. Preferably the hydrazide polymer has an average molecular weight of not less than 2,000 and an intrinsic viscosity $[\eta]$ of not more than 28 in water at 25° C.

In the present invention, the hydrazide polymer may be employed in a form of adduct with a water-soluble inorganic salt of an alkaline earth metal. Examples of the water-soluble inorganic salt employed are alkaline earth metal halides, sulfates and nitrates such as calcium halides, magnesium halides, barium halides, strontium halides, beryllium halides, magnesium sulfate, magnesium nitrate and calcium nitrate. Calcium chloride is preferably employed from an economical point of view.

The hydrazide polymer or its adduct is preferably employed in an amount of 0.01 to 5% by weight based on the weight of a pulp employed in paper making. When the amount of the hydrazide polymer or its adduct is less than 0.01% by weight, the qualities of paper are not sufficiently improved. When the amount of the hydrazide polymer or its adduct is more than 5% by weight, the process is poor in economy and a pulp tends to be flocculated so that uniform paper making is difficult.

In the present invention, the hydrazide polymer or its adduct is employed in combination with a heavy metal ion capable of forming chelate therewith. Examples of the heavy metal ion employed are ions of copper, cobalt, lead, zinc, iron, tin, mercury, nickel, cadmium and manganese. These ions may be employed alone or in admixture thereof. In case of regenerating waste papers, sometimes such heavy metal ions as mentioned above are contained in the waste papers per se. The heavy metal ion intended in the present invention also includes the heavy metal ions contained in the waste papers. In the present invention, it is preferable that the heavy metal ion is present at a concentration of 0.1 to 500 ppm. in a pulp slurry employed. When the concentration of the heavy metal ion is less than 0.1 ppm., the hydrazide polymer is not sufficiently fixed to a pulp. When the concentration of the heavy metal ion is more than 500 ppm., the effect corresponding to such a high concentration is not expected.

The reason why the qualities of paper is markedly improved by employing the hydrazide polymer or its adduct in combination with the heavy metal ion is indefinite. However, it is presumed that the hydrazide polymer or its adduct forms chelate with the heavy metal ion in water to give an amorphous material in a state of semi-solid or semi-liquid which is readily fixed to a pulp suspended in a pulp slurry.

Usually, in the present invention, the heavy metal ion and the hydrazide polymer or its adduct are added to a pulp slurry in that order. Of course, they may be added in the reverse order.

In paper making according to the process of the present invention, conventional agents for paper making such as paper strengthening agents, retention aids for sizing agents and agents for improving the retention of fillers may be also employed. In that case, a still more good result can be obtained by the effect of the combination of the hydrazide polymer or its adduct and the heavy metal ion in cooperation with the effects of such conventional agents. The preferable pH value of the pulp slurry is around neutrality, particularly 3.5 to 9.0.

The process of the present invention is suitably applicable to the preparation of papers from various pulps such as mechanical pulp, semichemical pulp, sulfite pulp and kraft pulp of needle-leaved trees and broad-leaved trees, bast fiber pulp, straw pulp, bagasse pulp and Manila hemp pulp. It is also suitably applicable to the regeneration of waste papers.

According to the present invention, it has been for the first time made passible to utilize the hydrazide polymer practically as an agent for improving the qualities of paper by employing it in combination with the heavy metal ion. Thus the present invention is of great value from an industrial point of view.

The present invention is more particularly described and explained by means of the following Examples, in which "%" is % by weight unless otherwise noted. In order to illustrate the preparation of the hydrazide polymers, the following Reference Examples are also presented.

REFERENCE EXAMPLE 1

A three liter four neck flask was charged with 100 g. of a polymethyl acrylate having an average molecular weight of about 900,000 and 2 kg. of an 80% aqueous solution of hydrazine hydrate, and the reaction was then carried out at 80° C. for 8 hours with agitation in a stream of nitrogen. The obtained viscous reaction mixture was poured into about 20 kg. of methanol with agitation to give a white precipitate. After purified according to a reprecipitation method, the precipitate was dried at about 60° C. under vacuum. The obtained water-soluble polymer had a content of hydrazide group of 95% by mole. The content of hydrazide group was measured by an iodometric titration method.

REFERENCE EXAMPLE 2

A three liter four neck flask was charged with 1 kg. of a 20% aqueous solution of a polyacrylamide having an average molecular weight of about 45,000 and 1 kg. of an 80% aqueous solution of hydrazine hydrate, and the reaction was then carried out at 50° C. for 3 hours with agitation. The obtained reaction mixture was treated in the same manner as in Reference Example 1 to give a white water-soluble polymer. The obtained polymer had a content of hydrazide group of 37% by mole.

REFERENCE EXAMPLE 3

A three liter four neck flask was charged with 1 kg. of a 10% aqueous solution of a polyacrylamide having an average molecular weight of about 310,000 and 1 kg. of an 80% aqueous solution of hydrazine hydrate, and the reaction was then carried out at a temperature of 50° C. for 20 hours with agitation. The obtained reaction mixture was treated in the same manner as in Reference Example 1 to give a white water-soluble polymer. The obtained polymer had a content of hydrazide group of 89% by mole.

Into 190 g. of a 20% aqueous solution of calcium chloride was added 10 g. of the polymer to give an aqueous solution containing an adduct of the polymer and calcium chloride. It is presumed that the adduct was a complex salt.

REFERENCE EXAMPLE 4

A three liter four neck flask was charged with 1 kg. of a 20% aqueous solution of a polyacrylamide having an average molecular weight of about 310,000 and 1 kg. of an 80% aqueous solution of hydrazine hydrate, and the reaction was then carried out at a temperature of 55° C. for 5 hours. The obtained reaction mixture was treated in the same manner as in Reference Example 1 to give a white water-soluble polymer. The obtained polymer had a content of hydrazide group of 55% by mole.

REFERENCE EXAMPLE 5

A three hundreds ml. four neck flask was charged with 40 g. of a polymaleic anhydride having an average molecular weight of about 4,000 which was prepared according to the process described in British Pat. No. 1,193,146 and 40 g. of a 50% aqueous solution of hydrazine hydrate. The reaction proceeded smoothly with liberating heat. The obtained reaction mixture having a low viscosity was cooled to about 0° C. and poured into 500 ml. of methanol to give a yellow precipitate. After purified according to a reprecipitation method, the precipitate was dried at 60° C. under vacuum. The obtained watersoluble polymer had a content of hydrazide group of 97% by mole.

REFERENCE EXAMPLE 6

A three liter four neck flask was charged with 100 g. of an acrylamide-styrene copolymer containing 12% by mole of the styrene unit and 1.5 kg. of an 80% aqueous solution of hydrazine hydrate, and the reaction was then carried out at 80° C. for 10 hours with agitation in a stream of nitrogen. The obtained reaction mixture was treated in the same manner as in Reference Example 1 to give a white water-soluble polymer. The obtained polymer had a content of hydrazide group of 82% by mole.

EXAMPLES 1 to 2 and Comparative Examples 1 to 3

Three hundreds and sixty grams of cotton linter dried absolutely was torn by hands, added into 10 kg. of water and disintegrated sufficiently. The obtained pulp slurry was placed in a TAPPI beater and water was added thereto until the total weight was 23 kg. (concentration of pulp: 1.57%). The pulp slurry was then beaten to a freeness (Canadian standard freeness) of 605. After beating, cupric sulfate was added to the pulp slurry in such an amount that the concentration of cupric ion was 100 ppm. After agitating for one minute, a 0.5% aqueous solution of each hydrazide polymer obtained in Reference Examples 1 and 2 was added to the pulp slurry in such an amount that the amount of the polymer was 1% based on the weight of the pulp employed. The pH value of the resulting pulp slurry was measured (Example 1: 5, Example 2: 4.5). The pulp slurry was agitated at 25° C. for one minute and subjected to paper making on a TAPPI standard sheet machine to give a paper having a basis weight of about 90 g./m². The obtained paper was dried at 105° C. After conditioning at 25° C. at 65% RH for 24 hours, the breaking length(provided in JIS P 8113) and the specific burst factor(provided in JIS P 8112) were measured (Examples 1 to 2).

For the purpose of comparison, the same procedures as described above were repeated except that no cupric sulfate or no hydrazide polymer was employed (Comparative Examples 1 to 3).

The results thereof are shown in Table 1.

TABLE 1

|  | Hydrazide polymer | $Cu^{++}$ | Breaking length (km.) | Specific burst factor |
| --- | --- | --- | --- | --- |
| Ex. 1 | Ref. Ex. 1 | Added | 1.72 | 1.00 |
| Ex. 2 | Ref. Ex. 2 | Added | 1.53 | 0.83 |
| Com. Ex. 1 | Not added | Not added | 1.29 | 0.59 |
| Com. Ex. 2 | Ref. Ex. 1 | Not added | 1.40 | 0.70 |
| Com. Ex. 3 | Ref. Ex. 2 | Not added | 1.35 | 0.65 |

EXAMPLES 3 to 8 AND COMPARATIVE EXAMPLE 4

Three hundreds and sixty grams of a waste corrugated board dried absolutely was torn by hands, added into 10 kg. of water and disintegrated sufficiently. The obtained pulp slurry was placed in a TAPPI beater and water was added thereto until the total weight was 23 kg. (concentration of pulp: 1.57%). The pulp slurry was then beaten to a freeness of 479. After beating, zinc chloride or cupric sulfate was added to the pulp slurry in such an amount that the concentration of each heavy metal ion was the value shown in Table 2. After agitating for one minute, a 0.5% aqueous solution of each hydrazide polymer obtained in Reference Examples 3 to 6 (the adduct of the hydrazide polymer and calcium chloride with respect to Reference Example 3) was added to the pulp slurry in such an amount that the amount of the polymer was 1% based on the weight of the pulp employed. After agitating at 25° C. for one minute, the freeness of the resulting pulp slurry was measured. The pH value of the pulp slurry was also measured (Example 3: 6.5, Example 4: 6.5, Example 5: 4.5, Example 6: 6). Then the pulp slurry was subjected to paper making on a TAPPI standard sheet machine to give a paper having a basis weight of about 110 g./m². The obtained paper was dried at 105° C. After conditioning at 20° C. at 65% RH for 24 hours, the breaking length, the specific burst factor and the specific compressive strength (provided in JIS P 8126) were measured (Examples 3 to 6).

The same procedures as in Examples 3 to 6 were repeated except that no heavy metal ion was employed (Examples 7 to 8). The waste corrugated board employed contained originally 22 ppm. of iron ion, 63 ppm. of zinc ion, 28 ppm. of copper ion and 19 ppm. of manganese ion. Therefore, the pulp slurry employed contained 0.34 ppm. of iron ion, 0.97 ppm. of zinc ion, 0.43 ppm. of copper ion and 0.29 ppm. of manganese ion, despite that no heavy metal ion was added thereto. The concentration of the heavy metal ions in the waste corrugated board was measured according to an atomic absorption spectrophotometry with respect to a sample solution prepared by extracting the board with a distilled water.

For the purpose of comparison, the same procedures as in Examples 7 to 8 were repeated except that no hydrazide polymer was employed (Comparative Example 4).

The results thereof are shown in Table 2.

TABLE 2

| | Hydrazide polymer | Heavy metal ion added Kind | ppm. | Freeness | Breaking length (km.) | Specific burst factor | Specific compressive strength |
|---|---|---|---|---|---|---|---|
| Ex. 3 | Ref. Ex. 3 | $Zn^{++}$ | 100 | 613 | 5.19 | 3.73 | 12.4 |
| Ex. 4 | Ref. Ex. 4 | $Zn^{++}$ | 100 | 621 | 4.92 | 3.80 | 12.2 |
| Ex. 5 | Ref. Ex. 5 | $Cu^{++}$ | 200 | 595 | 4.42 | 2.69 | 10.2 |
| Ex. 6 | Ref. Ex. 6 | $Cu^{++}$ | 50 | 625 | 5.23 | 3.83 | 12.5 |
| Ex. 7 | Ref. Ex. 3 | Not added | | 580 | 4.96 | 3.02 | 11.0 |
| Ex. 8 | Ref. Ex. 4 | Not added | | 572 | 4.48 | 2.58 | 10.1 |
| Com. Ex. 4 | Not added | Not added | | 479 | 3.48 | 1.82 | 8.8 |

EXAMPLE 9 AND COMPARATIVE EXAMPLE 5

Three hundreds and sixty grams of a laubholz bleached kraft pulp dried absolutely was torn by hands, added into 10 kg. of water and disintegrated sufficiently. The obtained pulp slurry was placed in a TAPPI beater and water was added thereto until the total weight was 23 kg. (concentration of pulp: 1.57%). The pulp slurry was then beaten to a freeness of 326. A clay, a rosin sizing agent, aluminum sulfate, ferric chloride and the hydrazide polymer obtained in Reference Example 4 were added to the pulp slurry with agitating in that order at intervals of one minute. The clay, rosin sizing agent, aluminum sulfate and hydrazide polymer were employed in amounts of 20%, 0.5%, 0.8% and 1%, respectively, based on the weight of the pulp employed. Ferric chloride was employed in such an amount that the concentration of ferric ion in the pulp slurry was 15 ppm. The pH value of the resulting pulp slurry was 5. The pulp slurry was then subjected to paper making on a TAPPI standard sheet machine to give a paper having a basis weight of about 60 g./m². The obtained paper was dried at 105° C. After conditioning at 20° C. at 65% RH for 24 hours, the breaking length, the Schopper folding endurance (provided in JIS P 8114), the Stöckigt sizing degree (provided in JIS P 8122) and the ash content (provided in JIS P 8128) were measured (Example 9).

For the purpose of comparison, the same procedures as described above were repeated except that no ferric chloride and no hydrazide polymer were employed (Comparative Example 5).

The results thereof are shown in Table 3.

TABLE 3

| | Hydrazide polymer | $Fe^{+++}$ | Breaking strength (km.) | Folding endurance (times) | Sizing degree (seconds) | Ash content (%) |
|---|---|---|---|---|---|---|
| Ex. 9 | Added | Added | 5.20 | 20 | 27 | 14.66 |
| Com. Ex. 5 | Not added | Not added | 4.32 | 11 | 7 | 9.41 |

As is clear from Table 3, according to the process of the present invention employing the hydrazide polymer in combination with the heavy metal ion, the paper strength as well as the sizing degree and the retention of fillers are improved markedly.

What is claimed is:

1. A process for improving strength and retention of paper which comprises adding to a paper pulp slurry (a) a water-soluble polymer containing hydrazide group of the following general formula:

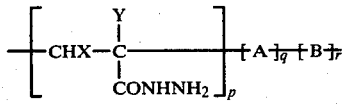

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:

$$30\% \text{ by mole} \leq p \leq 100\% \text{ by mole}$$

$$0\% \text{ by mole} \leq q+r \leq 70\% \text{ by mole}$$

$$p+q+r = 100\% \text{ by mole}$$

or its adduct with a water-soluble inorganic salt of an alkaline earth metal in an amount of at least 0.01% by weight based upon the weight of the pulp in the presence of (b) a heavy metal ion which is at least one ion of a heavy metal selected from the group consisting of copper, cobalt, lead, zinc, iron, tin, mercury, nickel, cadmium and manganese at a concentration of at least 0.1 ppm in the pulp slurry to chelate said polymer or its adduct.

2. The process of claim 1, in which the acrylate unit of the monomer unit (A) is derived from a monomer selected from the group consisting of methyl acrylate, ethyl acrylate, butyl acrylate and 2-ethylhexyl acrylate.

3. The process of claim 1, in which the methacrylate unit of the monomer unit (A) is derived from a monomer selected from the group consisting of methyl methacrylate, ethyl methacrylate and butyl methacrylate.

4. The process of claim 1, in which the monomer unit (B) is derived from a monomer selected from the group consisting of vinyl chloride, vinylidene chloride, vinyl acetate, butadiene, styrene, acrylic acid and acrylonitrile.

5. The process of claim 1, in which the watersoluble inorganic salt of an alkaline earth metal is an alkaline earth metal halide.

6. The process of claim 5, in which the alkaline earth metal halide is calcium chloride.

7. The process of claim 1, in which the watersoluble polymer or its adduct is employed in an amount of 0.01 to 5% by weight based on the weight of the pulp employed.

8. The process of claim 1, in which the heavy metal ion is present in the pulp slurry at a concentration of 0.1 to 500 ppm.

* * * * *